US009816610B2

(12) United States Patent
Van Rooij et al.

(10) Patent No.: US 9,816,610 B2
(45) Date of Patent: Nov. 14, 2017

(54) CONTROL SYSTEM FOR A CONTINUOUSLY VARIABLE TRANSMISSION

(71) Applicant: Gear Chain Industrial B.V., Eindhoven (NL)

(72) Inventors: Jacobus Hubertus Maria Van Rooij, Nuenen (NL); Wilhelmus Petrus Maria Schaerlaeckens, Bavel (NL)

(73) Assignee: Punch Powertrain NV, Sint-Truiden (BE)

( * ) Notice: Subject to any disclaimer, the term of this patent is extended or adjusted under 35 U.S.C. 154(b) by 118 days.

(21) Appl. No.: 14/648,728

(22) PCT Filed: Nov. 29, 2013

(86) PCT No.: PCT/NL2013/000058
§ 371 (c)(1),
(2) Date: Jun. 1, 2015

(87) PCT Pub. No.: WO2014/088411
PCT Pub. Date: Jun. 12, 2014

(65) Prior Publication Data
US 2015/0316148 A1 Nov. 5, 2015

(30) Foreign Application Priority Data
Dec. 3, 2012 (NL) .................................... 1039925

(51) Int. Cl.
*F16H 55/56* (2006.01)
*F16H 59/00* (2006.01)
(Continued)

(52) U.S. Cl.
CPC ... *F16H 61/66272* (2013.01); *F16H 61/0025* (2013.01); *F16H 61/0206* (2013.01); *F16H 61/66259* (2013.01)

(58) Field of Classification Search
CPC ......... F16H 61/66272; F16H 61/66259; F16H 61/12; F16H 61/662; F16H 2061/66286
(Continued)

(56) References Cited

U.S. PATENT DOCUMENTS 2,916,927 A * 12/1959 Opper ..................... F16H 55/56
474/28
3,016,754 A * 1/1962 Corey ................. B65H 23/1955
474/11
(Continued)

FOREIGN PATENT DOCUMENTS

GB 624546 A 6/1949
WO 0065253 A1 11/2000

OTHER PUBLICATIONS

International Search Report for related PCT Application No. PCT/NL2013/000058, dated Feb. 19, 2014.

*Primary Examiner* — Henry Liu
(74) *Attorney, Agent, or Firm* — Troutman Sanders LLP; Ryan A. Schneider

(57) ABSTRACT

Control system for a continuously variable transmission with a first and a second pair of conical sheaves each with adjustable running radius, in which of each pair at least one sheave (14a, 14b) is coupled to a first and a second hydraulic actuator (20a, 20b) respectively which sets the axial sheave position in dependence of the amount of hydraulic medium supplied thereto, in which the actuators are connected with means to supply and discharge thereto/therefrom respectively, hydraulic medium, and one actuator is connected to a source of hydraulic pressure medium, and in which furthermore the first and second actuator respectively is connected with a first and second control chamber (60, 124) respectively, filled with hydraulic medium and having a variable control volume, in such a way that an increase of the
(Continued)

Figure 1:
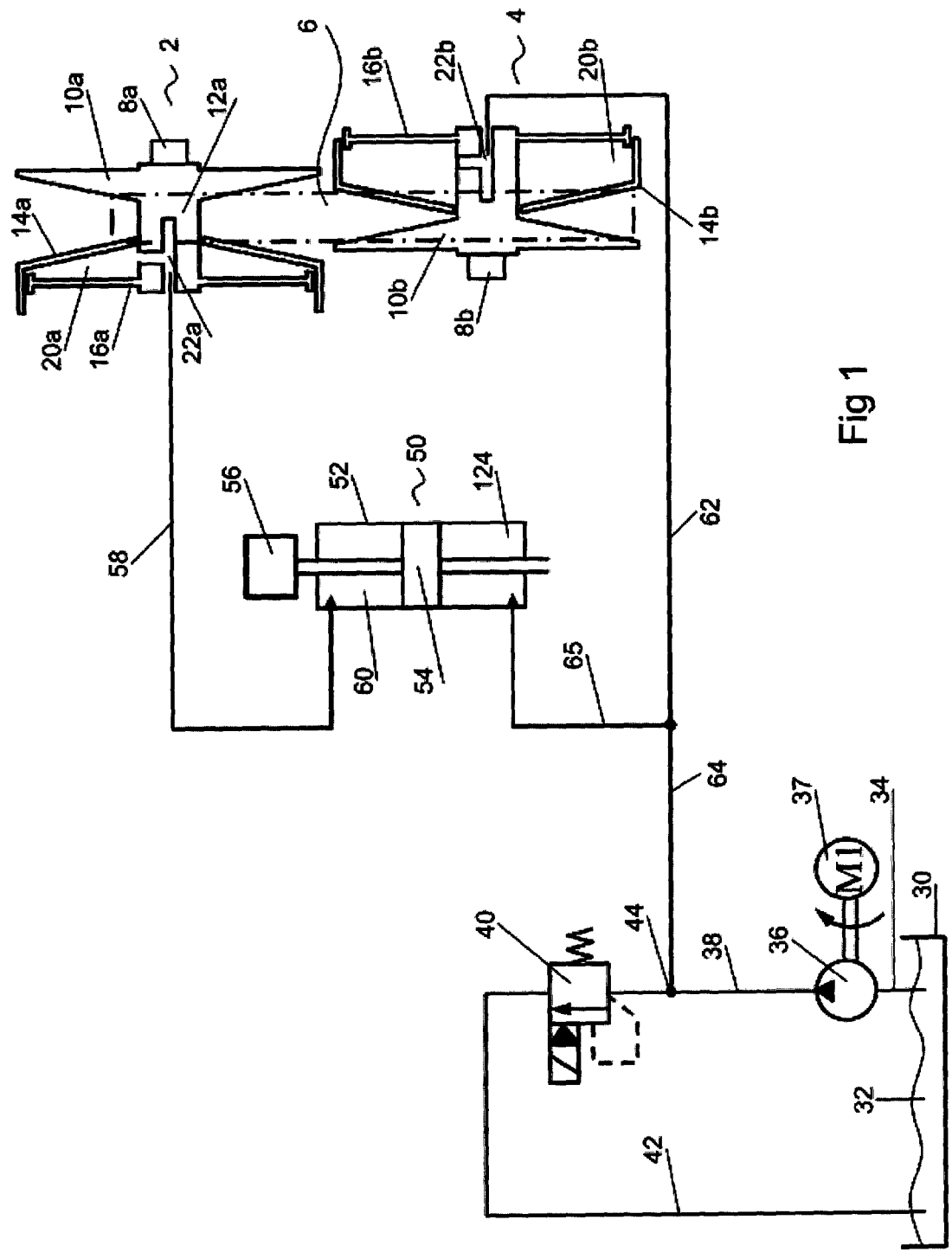

first control volume is coupled to a decrease of the second control volume, and vice versa.

8 Claims, 6 Drawing Sheets

(51) Int. Cl.
    *F16H 61/00*     (2006.01)
    *F16H 63/00*     (2006.01)
    *F16H 61/662*     (2006.01)
    *F16H 61/02*     (2006.01)

(58) Field of Classification Search
    USPC .................................................. 474/28, 18, 8
    See application file for complete search history.

(56) References Cited

U.S. PATENT DOCUMENTS

| | | | | |
|---|---|---|---|---|
| 4,369,675 | A * | 1/1983 | van Deursen | F16H 61/66263 474/18 |
| 4,439,170 | A * | 3/1984 | Steuer | F16H 61/6625 474/18 |
| 4,672,864 | A * | 6/1987 | Morimoto | B60W 10/02 474/28 |
| 4,714,451 | A * | 12/1987 | Yoshida | F16H 61/66259 474/28 |
| 4,767,384 | A * | 8/1988 | Moan | F16H 61/66272 474/28 |
| 4,795,407 | A * | 1/1989 | Ohsono | F16H 61/66263 474/28 |
| 4,798,561 | A * | 1/1989 | Hattori | F16H 61/66259 474/18 |
| 5,108,348 | A * | 4/1992 | Bornmann | F16H 61/66272 474/18 |
| 5,184,981 | A * | 2/1993 | Wittke | F16H 61/66272 474/18 |
| 5,279,525 | A * | 1/1994 | Rattunde | F16H 61/66272 474/28 |
| 5,295,915 | A * | 3/1994 | Friedmann | F16H 59/14 474/18 |
| 5,298,000 | A * | 3/1994 | Rattunde | F16H 61/66272 474/110 |
| 5,937,729 | A * | 8/1999 | Spiess | F16H 61/12 474/18 |
| 5,971,876 | A * | 10/1999 | Spiess | F16H 61/12 474/18 |
| 6,090,000 | A * | 7/2000 | Senger | F16H 61/12 474/18 |
| 6,565,464 | B1 * | 5/2003 | Panther | F15B 13/0402 285/123.15 |
| 6,623,387 | B1 * | 9/2003 | Luh | F16H 61/66272 474/28 |
| 6,682,451 | B1 * | 1/2004 | Luh | F16H 61/12 474/18 |
| 6,739,994 | B1 * | 5/2004 | Van Rooij | F16H 61/0031 474/18 |
| 6,832,965 | B2 * | 12/2004 | Inamura | F16H 61/66272 474/18 |
| 6,890,275 | B1 * | 5/2005 | Piepenbrink | F16H 61/66272 474/18 |
| 7,955,202 | B2 * | 6/2011 | Wagner | F16H 61/12 474/28 |
| 8,092,325 | B2 * | 1/2012 | Nozawa | F16H 55/56 474/18 |
| 2004/0058760 | A1 * | 3/2004 | Kuroda | F16H 63/067 474/18 |
| 2012/0035009 | A1 * | 2/2012 | Mano | F16H 61/0021 474/28 |
| 2012/0122628 | A1 * | 5/2012 | Frank | B60K 6/36 477/3 |

* cited by examiner

CONTROL SYSTEM FOR A CONTINUOUSLY VARIABLE TRANSMISSION

CROSS-REFERENCE TO RELATED APPLICATIONS

This application is a US National Stage of International Application No. PCT/NL2013/000058 filed 29 Nov. 2013, which claims the benefit of NL 1039925 filed 3 Dec. 2012, each herein fully incorporated by reference.

The invention relates to a control system for a continuously variable transmission (CVT) comprising a first and a second pair of conical sheaves with adjustable running radius, in which of each pair at least one sheave is coupled to a first respectively second hydraulic actuator determining the axial sheave position in dependence of the amount of hydraulic medium supplied thereto, the actuators being connected with means to supply and discharge hydraulic medium thereto and therefrom, and one actuator is connected with a supply of hydraulic pressure medium.

Such a control system is known from EP 1105665 and the corresponding U.S. Pat. No. 6,739,994, both in the name of Applicant. This known system comprises a first, two quadrant controlled pump-motor combination which supplies the base pressure and is connected with one of the actuators, while the means for the supply and discharge respectively of the hydraulic medium comprise a second, four quadrant controlled pump-motor combination which displaces hydraulic medium between the actuators and in this way controls the transmission ratio of the CVT.

Although this known control system has proven itself very well in practice and makes it possible to realise a fast and reliable control the problem arises of unexpected high leakage losses in particularly in the pump of the second pump-motor combination.

The invention aims to obviate this problem and to provide a control system of the kind as described above which can be constructed with simple components, in which there are less internal leakage losses and in which the problem of the reliably sealing of rotating components does not arise.

This is obtained with a control system in which the first and second actuator respectively is connected with a first and second respectively control chamber filled with hydraulic medium and provided with a controllable variable control volume, in such a way that an increase of the first control volume is coupled with a decrease of the second control volume, and vice versa. In this novel and inventive control system the problems known with the prior art do not arise while the control system operates fast and efficient.

Preferred embodiments are described in the sub-claims, in connection with which it is observed that in these embodiments a relatively simple and cheap structure is combined with a control which is fast and efficient and has little energy losses.

It is observed that WO 00/65253 describes a control system for a continuously variable transmission with hydraulically controlled actuators which drive the pulley sheaves in which the first and second actuator respectively of the pulley sheaves are supplied with pressure medium via the usual control valves.

A storage cylinder is provided with a freely movable piston which divides the cylinder in a first and a second chamber, both filled with the medium, and which are connected with the volume of pressure medium in the first respectively the second actuator. This piston is at both sides thereof, coaxially with the cylinder, connected to a first respectively second control piston in a first respectively second auxiliary cylinder. The supply to the first actuator and the supply to the second actuator comprises a first respectively second flow sensor which, when the flow surpasses a limit value, supplies the main medium pressure to the second respectively first auxiliary cylinder of which the piston then drives the main piston in such a way that the pressure medium is supplied to that actuator which, in fact, needs it. In this way one obtains a more efficient operation with a faster response.

The inventive idea is not known from this publication.

It is further observed that U.S. Pat. No. 2,916,927 describes a CVT with a first and a second pair of conical sheaves, in which the respective adjustable sheaves of each pair are hydraulically intercoupled in that each such sheave is connected to a piston in a closed cylinder while the respective cylinder spaces beneath each piston are filled with hydraulic medium and are interconnected by a hydraulic line. In this way setting movements of the first, mechanically driven, adjustable sheave are hydraulically transmitted to the second adjustable sheave.

The inventive idea in not known from the publication either.

Figure 2:
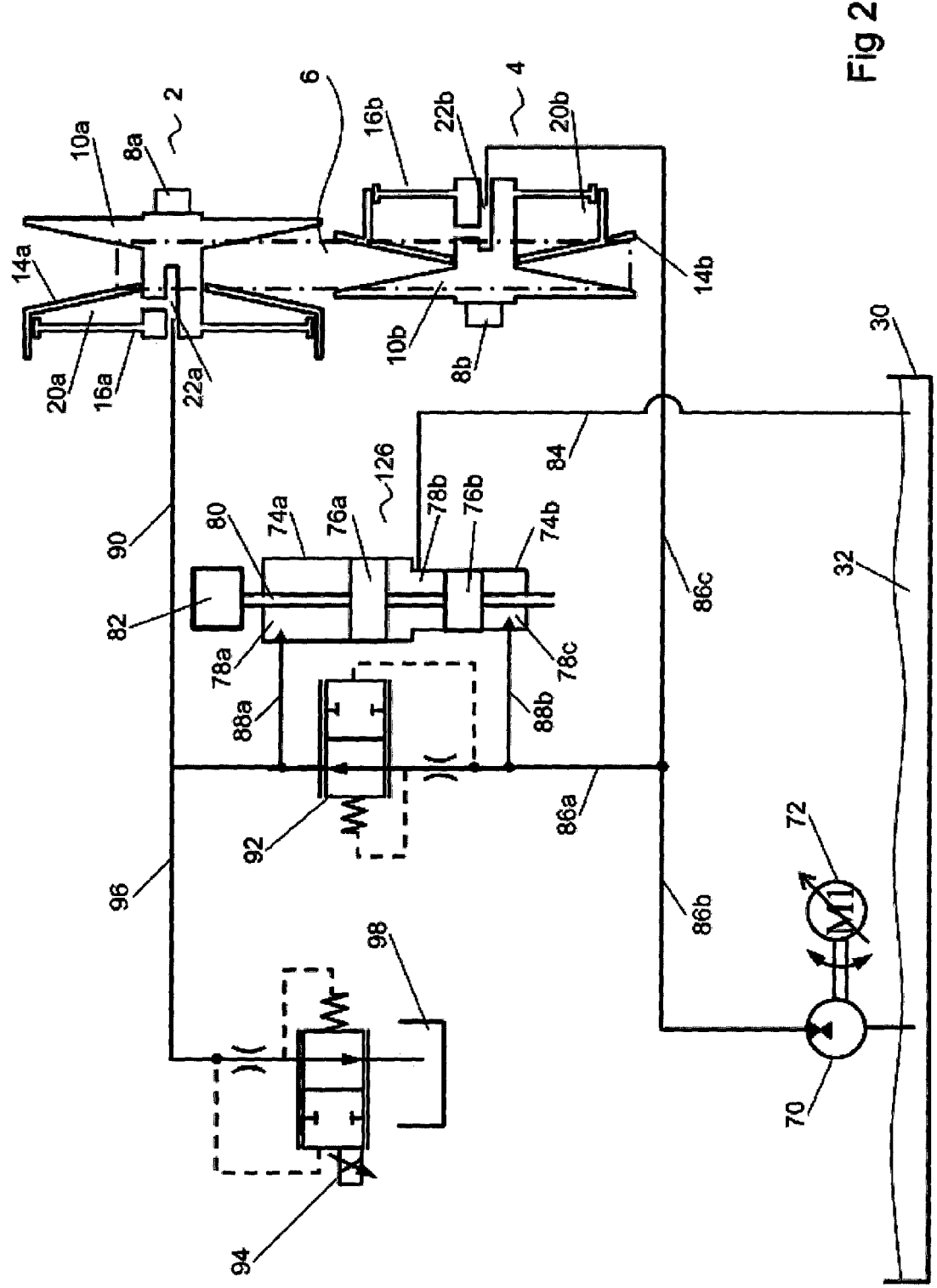
Figure 3:
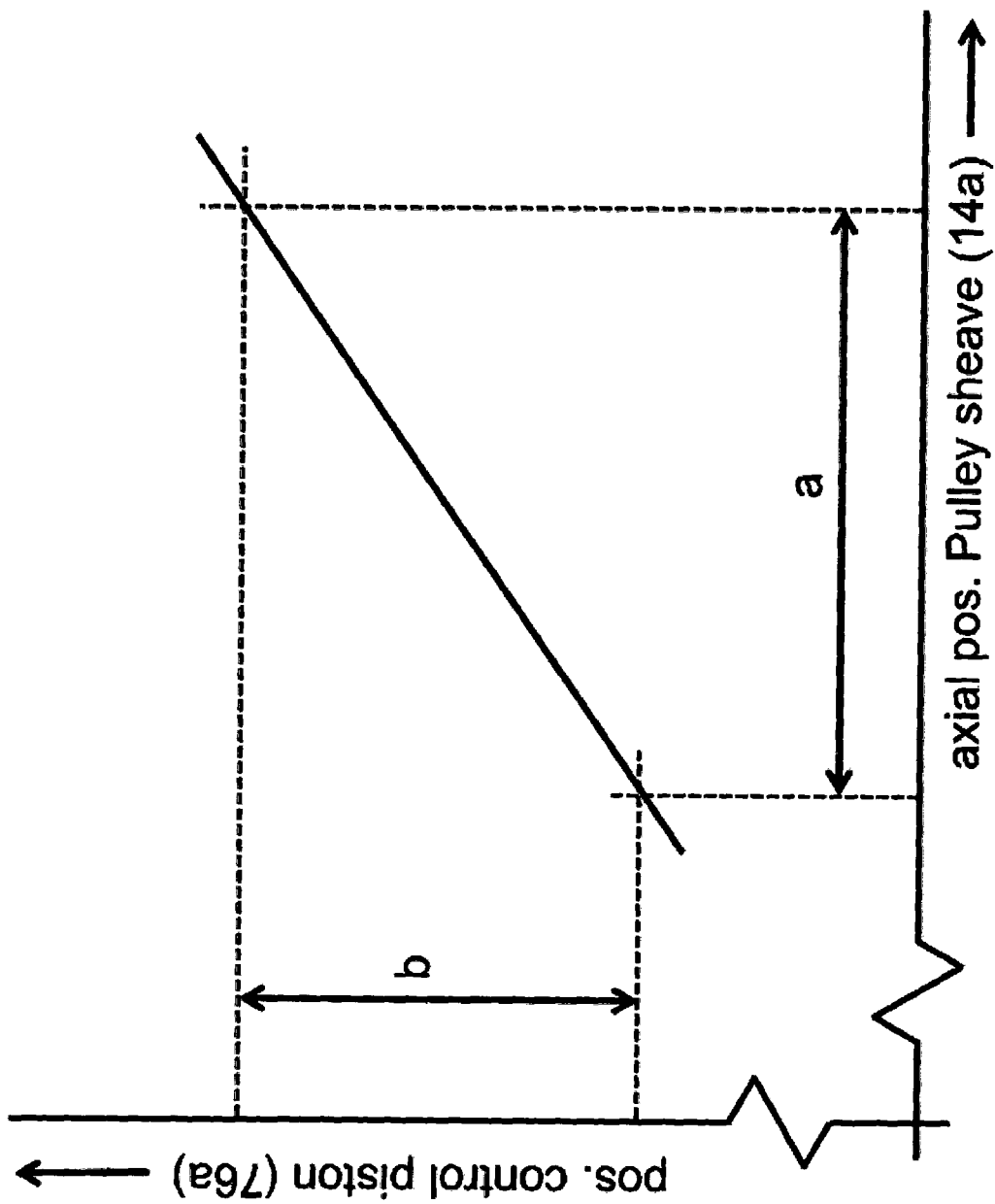
Figure 4:
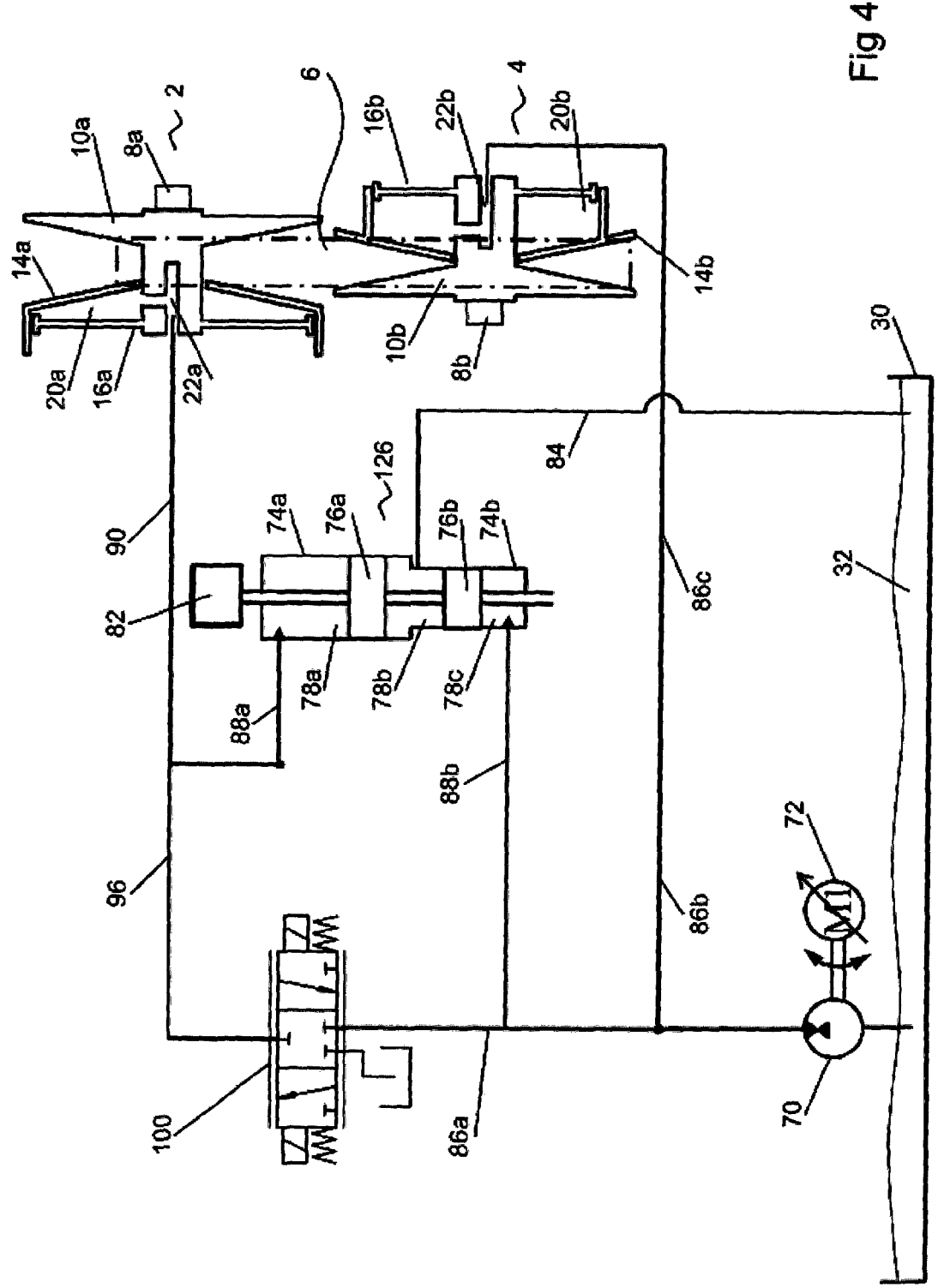
Figure 5:
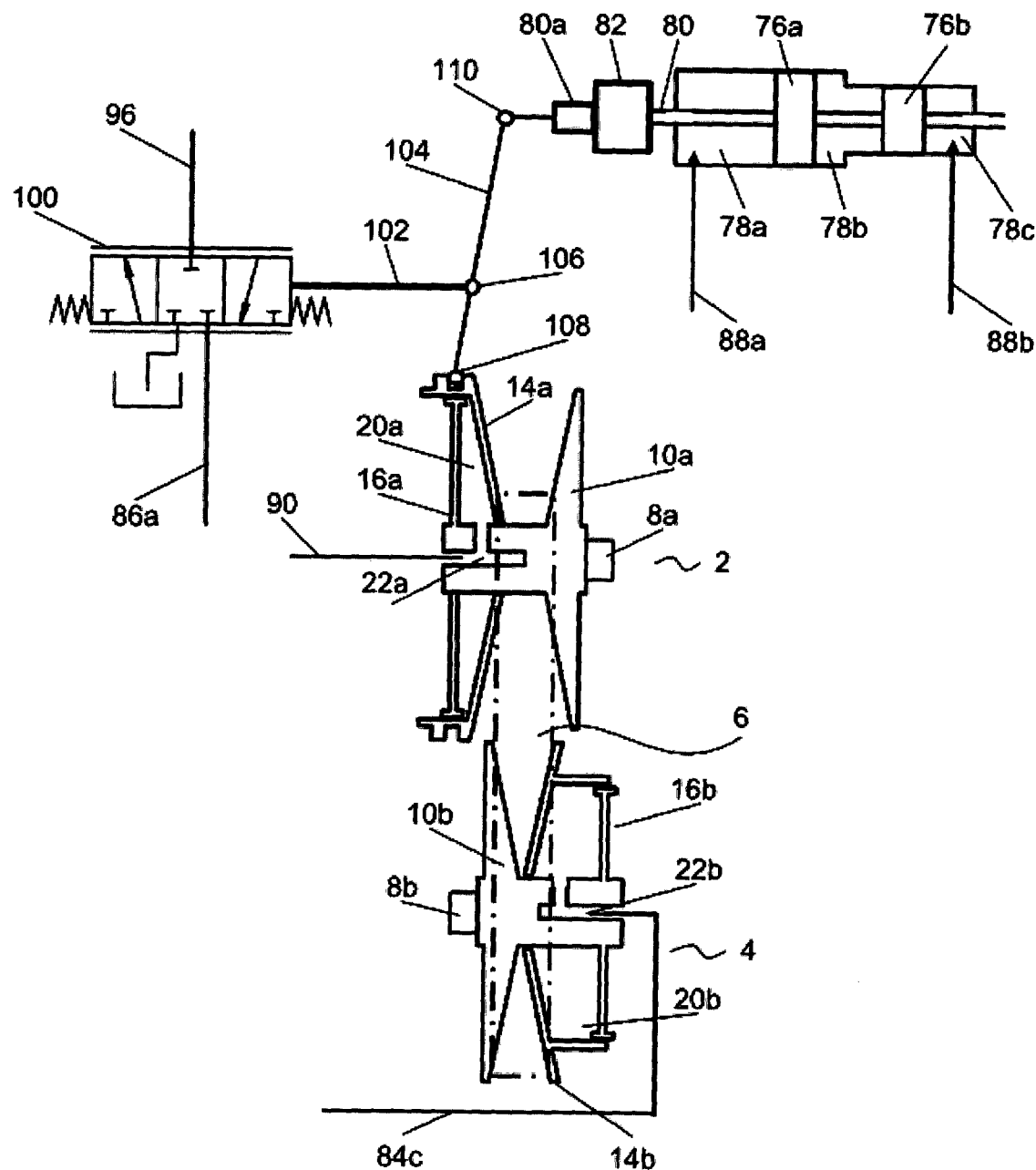
Figure 6:
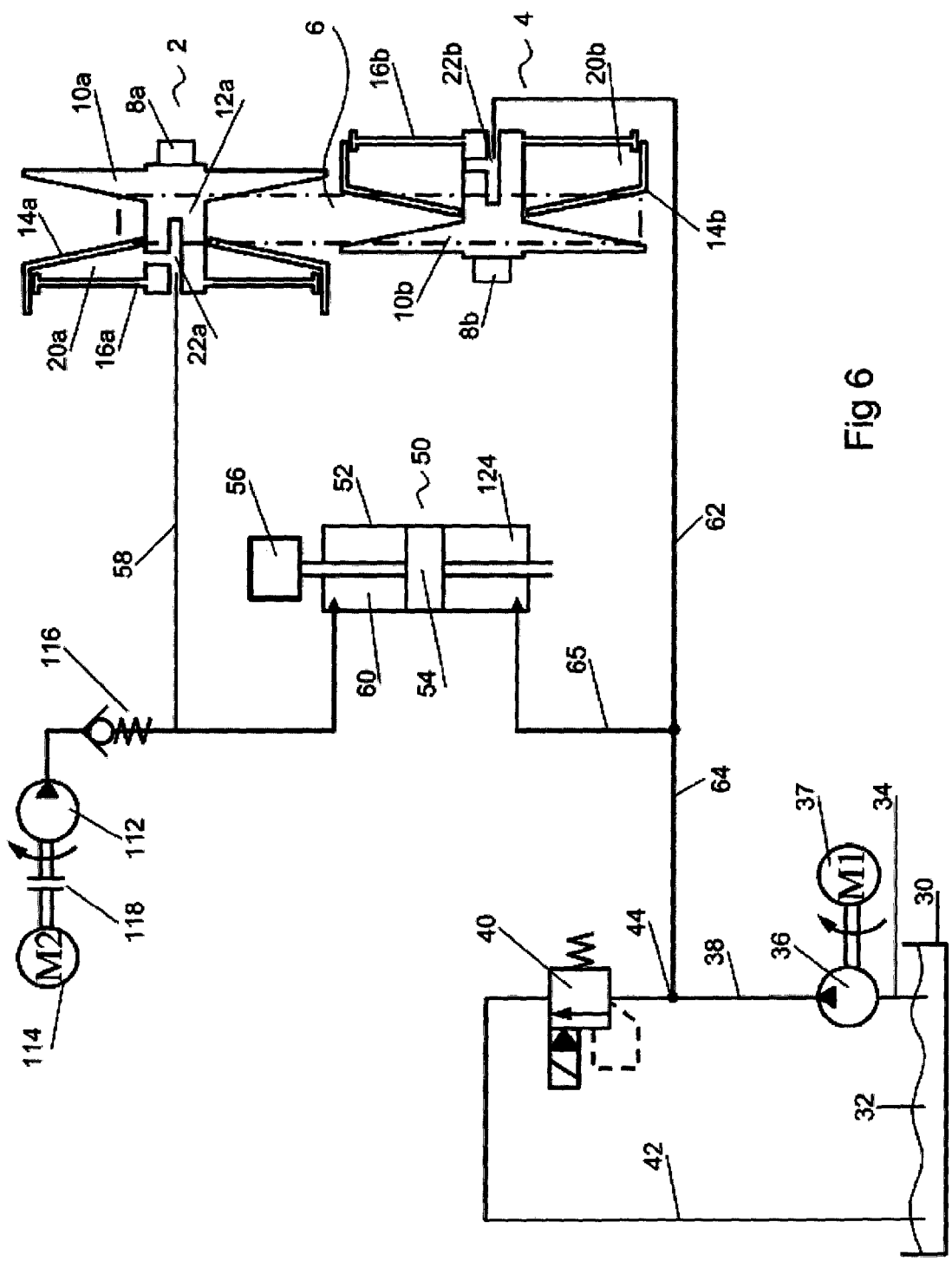

The invention is elucidated on the hand of the drawing. In this drawing shows:

FIG. 1 very schematically the main components of a first embodiment according to the invention;

FIG. 2, also schematically, the main components of the second embodiment of the invention;

FIG. 3 the relation between the position of the control piston and the position of an actuator corresponding therewith;

FIG. 4 schematically a third embodiment;

FIG. 5 schematically a fourth embodiment;

FIG. 6 schematically a fifth embodiment.

In FIG. 1 reference numeral 2 denotes the primary pair of pulley sheaves, and reference numeral 4 denotes the second, secondary, pair of pulley sheaves of a continuously variable transmission. Such transmissions are commonly known; vide, for instance, FIG. 1 from the publication: Hydraulic System, Shift and Lock up Clutch controls Developed for a Large Torque Capacity CVT (Yamamoto et al, Jatco Ltd, UC Davis, 2004). Both the pairs of pulley sheaves are torque transmitting and rotationally coupled with each other via an endless transmission belt 6 slung around them, for instance a transmission chain of the kind as known from EP 0741255 in the name of Applicant.

The primary pair 2 comprises the first conical pulley sheave 10a which is fixed to the driving shaft 8a and the second conical pulley sheave 14a which can shift on the hub 12a; the inner surface of this pulley sheave 14a delimits, in combination with the rear wall 16a which is fixed to the shaft 8a, a first actuator chamber 20a into which pressure medium can be supplied or discharged via the conduit 22a and the line 58.

A similar structure is used for the second pair of pulley sheaves 4. In the drawing the respective components thereof are indicated with the same reference numerals as used in relation to the first pair of pulley sheaves but provided with the suffix "b". The secondary pulley sheave pair 4 is in the usual way placed in such a way with respect to the primary pair 2 that the fixed pulley sheaves 10a and 10b and the shiftable pulley sheaves 14a and 14b are crosswise positioned with respect to each other. The pair 4 comprises a second actuator chamber 20b to which pressure medium can be supplied and/or discharged via the conduit 22b and the line 62.

It is observed that drawing 1 shows the diameters of the rear walls 16a and 16b as equal, which means that the active piston surfaces A of both the actuator chambers 20a and 20b are equal to each other so that at an equal pressure in these chambers identical clamping forces are exerted on the transmission element 6 by both the pulley sheave pairs 2 and 4.

The hydraulic medium is obtained form a sump 30 which can be, for instance, the sump of the transmission itself. This medium is sucked up via hydraulic line 34 by pump 36 which is driven by a suitable driving means, for instance an electrical motor 37. A controllable dumping valve 40 with a dumping line 42 and connected to the outlet line 38 of the pump 36 ensures that at the output of the pump 36, thus at the junction point 44, and in the hydraulic lines 38, 62, 64 and 65 there is a controllable medium pressure. This pressure is set in dependence upon the momentous torque load and transmission ratio on a minimum value necessary to prevent slipping of the transmission element 6 with respect to one of the pulley sheave pairs 2, 4.

Another set-up is also possible and this will be elucidated on the hand of the FIGS. 2 and 4.

The control of the CVT, thus the momentous setting of the respective running radiuses of the primary pulley sheave pair 2 and the secondary pulley sheave pair 4 respectively is effected by a controlling cylinder-piston combination 50, comprising the cylinder 52 and the single piston 54 accommodated therein, and the position of this piston is set by a setting means, indicated with 56, for instance a screw drive, driven by an electric motor.

A hydraulic line 58 goes from the inlet 22a of the primary pulley sheave pair to the space 60 in the cylinder 50 above the piston 54, a second hydraulic line 62 goes via line 65 from the connection 22b of the secondary pulley sheave pair 4 to the space 64 beneath the piston 54. This hydraulic line 62 is also connected via the line 64 to the junction 44 and at which point the pressure reigns as determined by the dumping valve 40.

When starting up the system it must be ensured that both the chambers 20a and 20b, the cylinder spaces 60 and 64 and all hydraulic lines are entirely filled with hydraulic medium. Then the position of the control piston 54 will directly control the position of the primary pulley sheave 14a and also, indirectly via the endless transmission chain 6, the position of the secondary pulley sheave 14b and to change the transmission ratio of the CVT the position of this piston 54 in the cylinder 52 must be changed. When the piston is moved upwardly hydraulic medium flows via the line 58 to the actuator chamber 20a and the pulley sheave 14a moves to the right; at the same time hydraulic medium flows from the actuator chamber 20b into the space 64 so that the pulley sheave 14b also moves to the right and the running radius of the transmission belt 6 decreases with respect to same of the secondary pulley sheave pair 4 while at the same time the running radius of the transmission element on the pulley sheave pair 2 increases. Because the actuator chambers 20a, the cylinder space 60 and the line 58 constitute a closed volume it is possible that in certain circumstances, for instance when the running radius of the transmission belt 6 on the pulley sheave pair 2 is greater than the running radius on the pulley sheave pair 4 the pressure in the actuator chamber 20a will be higher than the pressure in the chamber 20b, the latter being determined by the valve 40.

During the shifting of the transmission the volume flows to and from the two actuator chambers 20a and 20b are not always mutually equal. This is compensated by a more or less dumping of the pressure medium via the controllable dumping valve 40.

Although the system as described above has the advantage of a very simple structure and a small number of simple components together with a very efficient way of controlling as a result of the low pumping flow in combination with the possibility to operate with relative high pressures, while little force is necessary to control the piston 54, this system has the drawback that, to obtain a correct operation, there must be absolutely no long term leakage. Medium which leaks from the secondary actuator chamber 20a poses no problem because the amount leaked away can be compensated via pump 36 but when medium leaks form the primary circuit—the space 60, the line 58 and the primary actuator chamber 20a the pulley sheave 14a will gradually shift to the left and finally reaches its abutment so that then no control is possible anymore.

This problem is solved in the embodiment according to FIG. 2 which is based on the same principle as described above but which embodiment has the advantage that, at the cost of only one extra component and a somewhat changed structure of the control cylinder the drawback of the "running away" of the primary pulley sheave in case of leakage is obviated.

In FIG. 2 those components which correspond with components already described on the hand of FIG. 1 are indicated with the same reference numerals. They will not be described anew. There is, however, an important difference between the two pulley sheave pairs shown in FIG. 2: the diameter of the rear wall 16a is greater than the diameter of the rear wall 16b. Thus the active piston surface A1 of the pulley sheave pair 2 is greater than the active piston surface A2 of the pulley sheave pair 4.

In the embodiment according to FIG. 2 the pressure medium 32, present in, for instance, the sump 30 of the transmission, is provided by means of a pump 70 which is driven by a two quadrant controllable servo motor 72 which his driven in such a way that the suitable secondary pressure is obtained. The necessary oil flow is generated automatically as a result of what is necessary during the shifting of the transmission. As already said such a system can also be used in the embodiment according to FIG. 1 and in the embodiment of FIG. 2 it is also possible to use the embodiment with pump and dumping valve as shown in FIG. 1.

A second important difference from the embodiment according to FIG. 1 is the structure of the control piston-cylinder combination, which his here denoted with reference numeral 126. This combination consists here of two parts, a first part 74a which contains a first piston 76a followed by a second part 74b with smaller diameter comprising a second piston 76b. This defines three spaces:

a first space 78a, above the piston 76a,
a second space 78b between the pistons 76a and 76b, and
a third space 78c below the piston 76b.

The position of the two pistons 76a and 76b with their common piston rod 80 is controlled by the schematically shown electrical control means 82 which in this embodiment can also consist of, for instance, an electrically driven screw.

Pressure medium which leaks past the pistons 76a and 76b respectively and thus enters into the space 78b is discharged via the hydraulic line 84 which returns this medium to the supply 32. The pressure in the space 78b is practically zero.

The space 78c below the piston 76b is via the line 86a, 86b connected to the discharge outlet of the pump 70. Via this line 86a the discharge connection of the pump is connected to the inlet 22b of the secondary pair of sheaves. There the full working pressure is present.

Purpose of the described structure is to compensate possible leakage losses in the primary pulley sheave pair by means of bringing about a, small, flow of medium from the line 86a which carries the full operating pressure to the line 90 which is connected with the inlet 22a of the primary pulley sheave pair 2. This is only possible when the pressure at the primary pulley sheave pair 2 is lower than the pressure on the secondary pulley sheave pair 4. It is possible, for instance when the running radius of the transmission element 6 on the pulley sheave pair 2 is greater than the running radius of this element on the pulley sheave pair 2 that a greater clamping pressure is called for on the pulley sheave pair 2 than on the pulley sheave pair 4. As in this embodiment the pressure in the line 90 can never be higher than the secondary pressure supplied by pump 70 the piston surface A1 must be greater so that the actuator chamber 20a can still exert the necessary clamping pressure. The pressure in the lower cylinder space 78c which is the pressure in the secondary pulley sheave pair, must thus always be higher than the pressure in the upper cylinder space 78a, which is the pressure in the primary pulley sheave pair. Via a flow control valve 92 with a fixed setting a constant medium flow from line 120 to line 121 is brought about. Such a control valve can, for instance, be a valve of the type FR 50-23 by HydraForce. The pressure medium flow which is set by the flow control valve 92 must always be higher than the leakage losses in the primary pulley sheave pair. Therefore there must be a provision to return excess medium to the sump 30. In the present embodiment one uses a controlled flow control valve 94, via the line 96 connected to the lines 90 and 122 and discharging oil to, for instance, an auxiliary sump 98 or directly in the stump 30. This medium can also be used to lubricate and cool the components of the variator. An example of such a valve is the type ZL 70-30 by HydraForce.

Such an electronically controlled flow control valve is preferably used for "fine tuning" the medium flow from and to the primary chamber 20a and therewith the transmission ratio of the transmission.

The control system as described above operates as follows: the running radius of the transmission element is coupled to the axial position of the shiftable pulley sheave 14a. This axial position is at its turn coupled to the position of the piston 76a such as indicated in the graph of FIG. 3. When one wants to shift the axial position of the pulley sheave 14a (given on the horizontal axis) from a first position to the second position over a distance "a", the piston 76a must move over a distance "b" in its longitudinal direction as indicated along the vertical axis. This interconnection is a fixed one because the sum of the volumina of the actuator chamber 20a and the cylinder space 78a remains constant. This all goes when the medium flow in the line 121 as set by means of the flow control valve 92 is equal to the medium flow in line 96 which is set by the controllable flow control valve 94 and there is no leakage of medium and thus no excess medium. As a result of very small leakage of medium from the actuator chamber 20a to its surroundings the pulley sheave 14a will, however, move over a somewhat smaller distance than the value "a". By decreasing, by means of the controllable flow control valve 94, the medium flow in line 96 somewhat, the small leakage of medium from the actuator chamber 20a is compensated. As a result of this the correct relation between the position of the piston 76a and the position of the pulley sheave 14a is ensured. During shifting in opposite direction the system operates in an analogous way.

In such a control system one can obtain, by a suitable choice of the ratios of the diameters of the pistons 76a and 76b, that the force necessary to move the common piston rod is minimal so that the power necessary for driving the control means 82 is also minimal.

Because the axial displacements of the shiftable pulley sheaves 14a and 14b are inter-coupled via the transmission element 6 one can also use this control system on the basis of the axial displacement of the shiftable pulley sheave 14b.

FIG. 4 shows a variation of the embodiment of the invention according to FIG. 2. Here the flow control valve 92 and the flow control valve 94 are omitted, while the line 86a is only connected with the lines 86b and 86c, while between the line 86d and the line 96 an electrically controlled control valve 100 is connected which is via the line 86d connected with the pump 70. The way of operating of the control system of FIG. 4 is equal to the operation of the system according to FIG. 2 with the difference that the "fine tuning" of the axial position of the shiftable pulley sheave 14a now is done by means of the control valve 100. By means of the control valve 100 and via the conduit 96 a second medium flow can be directed to and from the actuator chamber 20a so that leakage of medium in the pulley sheave pair 2 and the combination 126 of control piston and cylinder can be compensated. In this way the correct relation between the position of the piston 76a and the pulley sheave 14a is ensured.

FIG. 5 shows in a partial diagram a embodiment of FIG. 4 in which the control valve 100 is controlled mechanically. Here there is a control rod 102 for the valve 100 which is connected with the pivot point 106 on the lever 104. This lever 104 is with its end pivots 108 and 110 connected to respectively the shiftable sheave 14a and the elongation 80a of the piston rod 80. Apart from that the embodiment of FIG. 5 is the same as the embodiment of FIG. 4. Components which are also shown in FIG. 4 are partly shown and provided with identical reference numerals.

When the piston 76a shifts to the left the shiftable pulley sheave 14a will shift to the right. When the system is free from leakage these displacements will have a fixed ratio with respect to each other and this ratio is set by the chosen ratio between the diameter of the piston 76a and the diameter of the rear wall 16a. One can find on the lever 104 a point 106 which will remain in place. This point 106 is connected to the control rod of the control valve 100. When there is leakage from the actuator chamber 20a or from the cylinder space 78a the mentioned fixed ratio between the displacements of the pulley sheave 14a and the piston 76a will be disturbed, with as a result that the pivot point 106 will be displaced and the control valve 100 will be actuated so that the "fine tuning" will take place automatically.

Of course the result, as aimed for in the embodiment of FIG. 4, can also be obtained when one provides the displaceable pulley sheave 14a and the piston rod 80 with displacement sensors connected to an electronic control circuit which controls the, then electrical, control valve 100.

FIG. 6 shows a variation of FIG. 1, in which here, too, the diameters of the rear walls 16a and 16b are mutually equal, in other words: the actuator chambers 20a and 20b have a mutually equal pressure surface A. This embodiment has a second pump 112 which can be coupled by means of the controllable clutch 118 to a driving motor 114. This second pump sucks medium via a line 119 from point 44 and the outlet thereof is connected via a one-way valve 116 with the line 58. When, caused by leakage, medium leaks out of the actuator chamber 20a and as a result thereof the pulley sheave 14 shifts, which is thus not the result of the control—this shifting is counteracted by energizing the clutch 118 so that via the pump 112 medium is supplied to line 58 and the leakage is compensated. It is possible that the pressure in the actuator chamber 20a will be higher than same in the actuator chamber 20b. The one-way valve 116 then prevents a flow back of medium out of the actuator chamber 20a via the line 58. Of course the clutch 18 can be omitted and instead thereof the pump 114 is then electrically switched on or off.

Of course in this embodiment and analogous to the embodiment of FIG. 2 the diameters of the rear walls 16a and 16b can be different while also a control piston-cylinder combination according to one denoted with 72 in FIG. 2 can be used.

The invention claimed is:

1. A control system for controlling a continuously variable transmission, the transmission comprising a first and a second pair of conical sheaves with adjustable running radius, in which of each pair one sheave is coupled to a first respectively second hydraulic actuator which determine the respective axial sheave positions in dependence of the amount of hydraulic medium supplied thereto, the effective surface of the first actuator being greater than same of the second actuator, the second actuator being connected directly to a supply of hydraulic pressure medium, the first actuator being hydraulically connected to a first cylinder space accommodating a first piston, controllably movable therein, the second actuator being hydraulically connected to a second cylinder space, accommodating a second piston controllably moving therein, the pistons being interconnected, coaxially in line and fixed to a common control rod which is controlled in a to-and-fro movement by controlled driving means, the effective surface of the first piston being greater than the effective surface of the second piston and the ratio of these respective effective surfaces having a value which is mainly equal to the ratio of the effective surface of the first actuator with respect to same of the second actuator the first cylinder space being hydraulically connected to a controllable pressure relief valve, while the second cylinder space, in which the supply medium pressure reigns, is connected to the first cylinder space via a conduit containing a pre-set throttle orifice which allows for a metered amount of hydraulic medium to flow from this second cylinder space to the first cylinder space.

2. The control system of claim 1, wherein the supply of hydraulic pressure medium is provided by a pump.

3. The control system of claim 2, wherein the pump is driven by a motor.

4. The control system of claim 3, wherein the motor comprises a two quadrant controllable servo motor.

5. The control system of claim 1, wherein the first and the second pair of conical sheaves are torque transmitting and rotationally coupled with each other via an endless transmission belt.

6. The control system of claim 1, wherein in each first and a second pair of conical sheaves, one sheave is fixed to a driving shaft.

7. The control system of claim 1, wherein the controlled driving means comprises an electrically driven screw.

8. The control system of claim 1, wherein the sum of the volumes of the first actuator and the first cylinder space is constant.

* * * * *